United States Patent
Ingalls

[11] 4,016,660
[45] Apr. 12, 1977

[54] EDUCATIONAL SYSTEM ALPHABET CARDS

[76] Inventor: Barbara Salvatore Ingalls, Rte. 1, Walworth, Wis. 53184

[22] Filed: Aug. 1, 1975

[21] Appl. No.: 601,200

[52] U.S. Cl. .................................. 35/71; 35/37
[51] Int. Cl.² ...................................... G09B 11/04
[58] Field of Search .......... 35/7 R, 7 A, 35 A, 35 J, 35/36, 37, 69, 70, 71; 283/45, 46

[56] References Cited

UNITED STATES PATENTS

| 222,349 | 12/1879 | Gilman | 283/45 |
|---|---|---|---|
| 1,103,369 | 7/1914 | Montessori | 35/71 |
| 2,523,828 | 9/1950 | Howe | 35/35 A |
| 3,314,171 | 4/1967 | Bethune | 35/37 |
| 3,382,592 | 5/1968 | Lucero | 35/37 |
| 3,774,319 | 11/1973 | Sprowls | 35/37 |
| 3,869,813 | 3/1975 | Hancy | 35/37 |

FOREIGN PATENTS OR APPLICATIONS

| 193,470 | 2/1923 | United Kingdom | 35/71 |

Primary Examiner—Harland S. Skogquist
Attorney, Agent, or Firm—Andrus, Sceales, Starke & Sawall

[57] ABSTRACT

Each card has one or more letters of the alphabet on its face, each letter comprising superimposed printed and cursive forms of substantially the same size with the coinciding portions thereof at a different level than the face of the card and/or than the remaining portions. Said remaining portions may be either of a different color from the coinciding portions and/or printed on the face of the card. The coinciding portions are tactually distinct from the remaining portions of the letters, i.e. connectors, smoothers and decorations, and these remaining portions may be tactually distinct from each other and/or the card itself, as by lowering them or raising them, using ridges, knoblike structures, roughness, different compositions or other means to distinguish them to the touch. Guide lines extend horizontally at the upper and lower extremities of the letter and at other significant parts of the letter either printed on the face of the card and/or at a different level therefrom.

4 Claims, 5 Drawing Figures

U.S. Patent      April 12, 1977      4,016,660
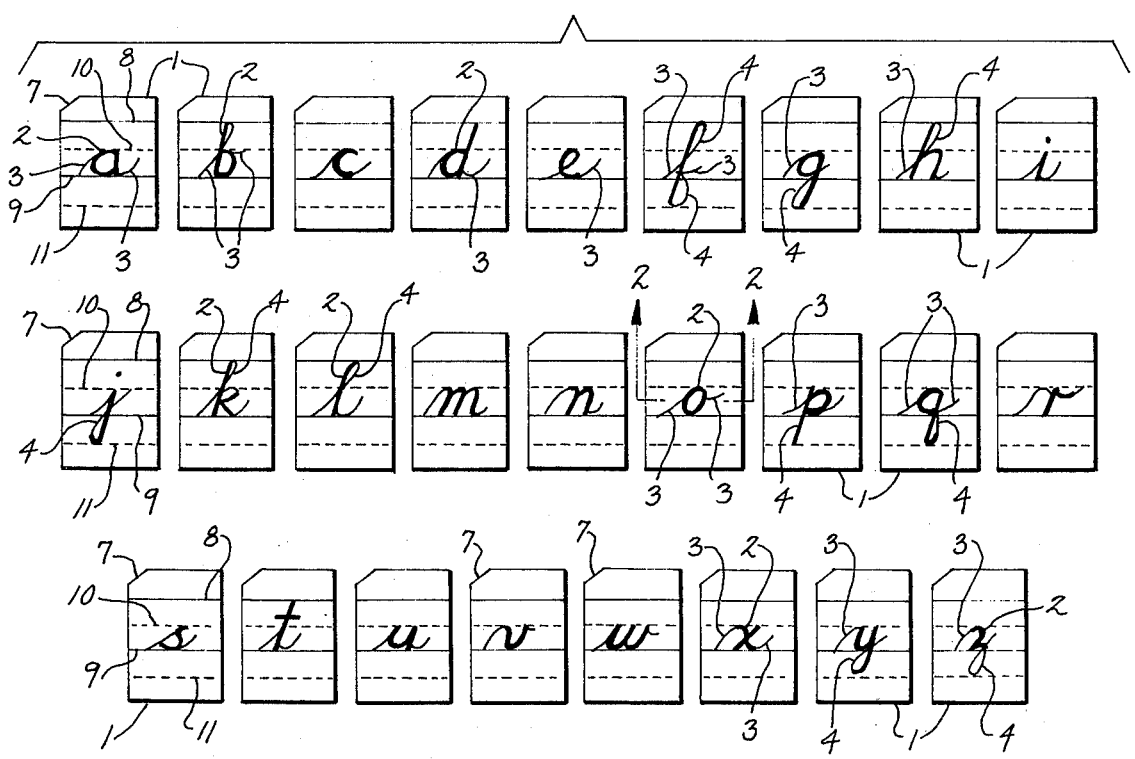
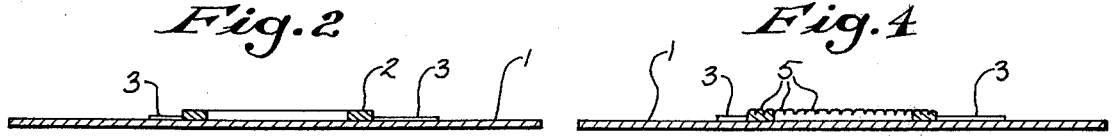
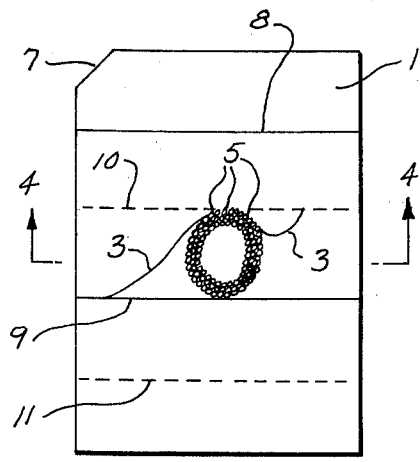
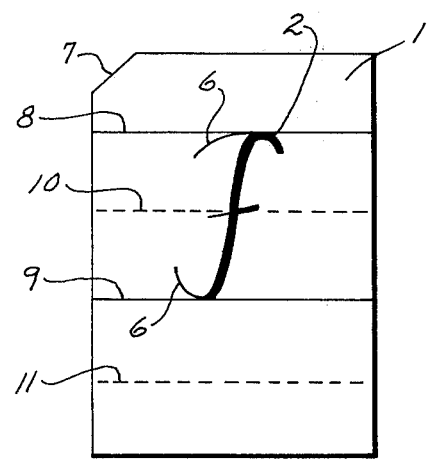

EDUCATIONAL SYSTEM ALPHABET CARDS

BACKGROUND OF THE INVENTION

This invention relates to educational system alphabet cards for use in teaching the alphabet letters and spelling principally to learning disabled students.

The use of "Flash" cards and the like, utilizing only printed letters on individual cards has not generally taken into account the perceptual, motor and other difficulties of the slow or learning disabled students.

Similarly, the use of templates or other drawing aids have had at best only a limited practical use for teaching learning disabled students.

Presently available techniques and materials do not: (1) take into account the poor memory ability of learning disabled students, (2) consider or alter the perceptual problems effecting cursive writing, and (3) affect the proprioceptive and kinesthetic problems effecting cursive writing.

Another problem lies in having them recognize that the printed and cursive shapes relate to the same letter in a given instance.

These problems occur particularly with respect to slow learners, the learning diabled and stroke patients.

SUMMARY OF THE PRESENT INVENTION

The present invention proposes the use of individual alphabet cards substantially larger than the usual "Flash" cards and upon which the lower case printed letters coincide with a part of the corresponding cursive letters.

The coinciding portions of the letters are distinguished from the remainder of the cursive letters which constitute connectors, smoothers and decorations, as by the employment of different colors therefor and/or other distinguishing characteristics.

Where it is desired to provide physically perceptual distinctions the coinciding portions of the letters are disposed at a level different from the face of the cards and from the level of the connectors, smoothers and decorations, and these latter may be disposed at a level different from the face of the card, and either may have other distinguishing characteristics such as being composed of a series of knob-like contours, ridges, texture, roughness or other tactually distinct means.

BRIEF DESCRIPTION OF THE DRAWING

The accompanying drawing illustrates the preferred embodiments of the invention as presently contemplated by the inventor.

In the drawing:

FIG. 1 is a plan view of a set of cards displaying lower case printed and cursive letters of the alphabet thereon;

FIG. 2 is an enlarged transverse section of the card bearing the letter O taken on line 2—2 of the corresponding card in FIG. 1;

FIG. 3 is a plan view of a card showing a modified construction for the letter O, applicable as well to other letters;

FIG. 4 is an enlarged transverse section taken on line 4—4 of FIG. 3; and

FIG. 5 is a plan view of a card bearing the letter F in upper case illustration.

DESCRIPTION OF THE PREFERRED EMBODIMENT

In the embodiment of FIGS. 1 and 2, each letter of the alphabet is displayed on a separate card 1 with coinciding portions of the corresponding printed and cursive shapes shown in heavy raised line 2 from the surface of the card.

The connectors 3 for the cursive shape of each letter is shown as a thin line preferably raised from the face of the card but at a lower level than the tops of lines 2.

The smoothers 4 for the cursive shape of certain letters where needed, are preferably of the same general construction as the connectors 3 and may be in another color.

In the embodiment illustrated in FIGS. 3 and 4 the coinciding lines of the printed letter O in lower case are shown in the formation of a series of raised knobs 5 which are distinctive to the touch of the student as well as to the sight, while the cursive connector lines 3 are generally smooth and continuous, and of a lower level as provided in FIGS. 1 and 2. Various distinctions may be employed between these lines as may be desired.

It is contemplated that in plan view the overlapping or coinciding lines 2 or knobs 5 of the corresponding printed and cursive letters will be constructed preferably in a band of a distinctive color whereas the connectors 3, and smoothers 4 of the cursive shapes will be constructed in a band of a contrasting width, heighth, texture and/or color different also from the color of the face of the card.

In teaching students that readily learn by sight perception the color distinctions alone may be of primary importance.

For those students who need the aid of feel as by touching the letters with a finger, the raised lines 2 or knobs 5 and raised lines 3 and 4 become important. This may be particularly so with students having impaired eyesight, color blindness or impaired visual perception.

Many slow learning students will advance faster in learning the alphabet by simultaneously utilizing both the sight perception of color distinction and the touch perception of the physical distinctions provided by the present invention.

The invention may be employed in teaching upper case forms of letters as shown in FIG. 5. In this case connectors are not always employed and the coinciding lines of the printed and cursive letters may be constructed as for lower case letters. Decorators 6 generally become more important with upper case letters.

However, in FIG. 5 the capital letter F is illustrated and the coinciding line 2 is raised from the face of the card 1 similar to the lines 2 of FIGS. 1 and 2. The decorative lines 6 show the added cursive embellishment for the letter and are constructed similar to the connectors 3 and smoothers 4 of FIGS. 1 and 2.

The cards 1 should have some form of orientation means such as a notch 7 in the upper or lower edge which may be in the form of a triangular cut at one given corner of each card so that the student may learn to arrange the cards in properly oriented position when assembling letters for various purposes.

Additional aid in visualizing the written word is provided by parallel guidelines in printed form on the face of each card 1. For this purpose the upper continous guideline 8 is disposed horizontally at the maximum height extremity for those letters that extend upwardly the farthest. A second continuous guideline 9 is disposed horizontally at the base of each letter.

An intermediate dotted or otherwise distinguished guideline 10 is disposed horizontally at the intermediate height for letters that possess features that extend to approximately only half the height to line 8. A similar dotted or otherwise distinguished guideline 11 is disposed horizontally below the base line 9 at the lower extremity for those letters that drop below the base line.

When the cards 1 are assembled side by side as in FIG. 1, the corresponding lines 8, 9, 10 and 11 on the adjacent cards will be in alignment and will tend to teach the student the correct relationship of adjacent letters for reading and writing purposes. For this purpose the position of the corresponding lines 8, 9, 10 and 11 is the same on the entire set of cards.

It will be understood that the cards and letters should be large to enable the student to follow the letter outline with his finger in gaining perception of the shapes involved.

The cards 1 are preferably made of stiff synthetic plastic material and the letters may be either molded integrally therewith or made separately of similar material or of different composition and glued in place upon the face of the cards.

Various modes of carrying out the invention are contemplated as being within the scope of the following claims particularly pointing out and distinctly claiming the subject matter which is regarded as the invention.

I claim:

1. In an educational system, a set of cards each having on its face a letter of the alphabet in cursive form at a distinctive level different than said face and having a printed form of the same letter disposed in coinciding relation to a portion of said cursive form with the connectors, smoothers and decorations of the cursive form when present at a level distinctively different from said printed form.

2. The cards of claim 1 in which the cursive form connectors, smoothers and decorations are distinctively colored from the color designation of said printed form.

3. The cards of claim 1 in which the coinciding portions of the printed and cursive forms and the remaining cursive portions are tactually distinct.

4. The cards of claim 3 in which one of said portions has a surface of different tactually identifiable structure than the surface of said other portions.

* * * * *